July 6, 1937.  J. R. PILON  2,086,092
SHADE APPARATUS FOR VEHICLES
Filed March 23, 1936  2 Sheets-Sheet 1
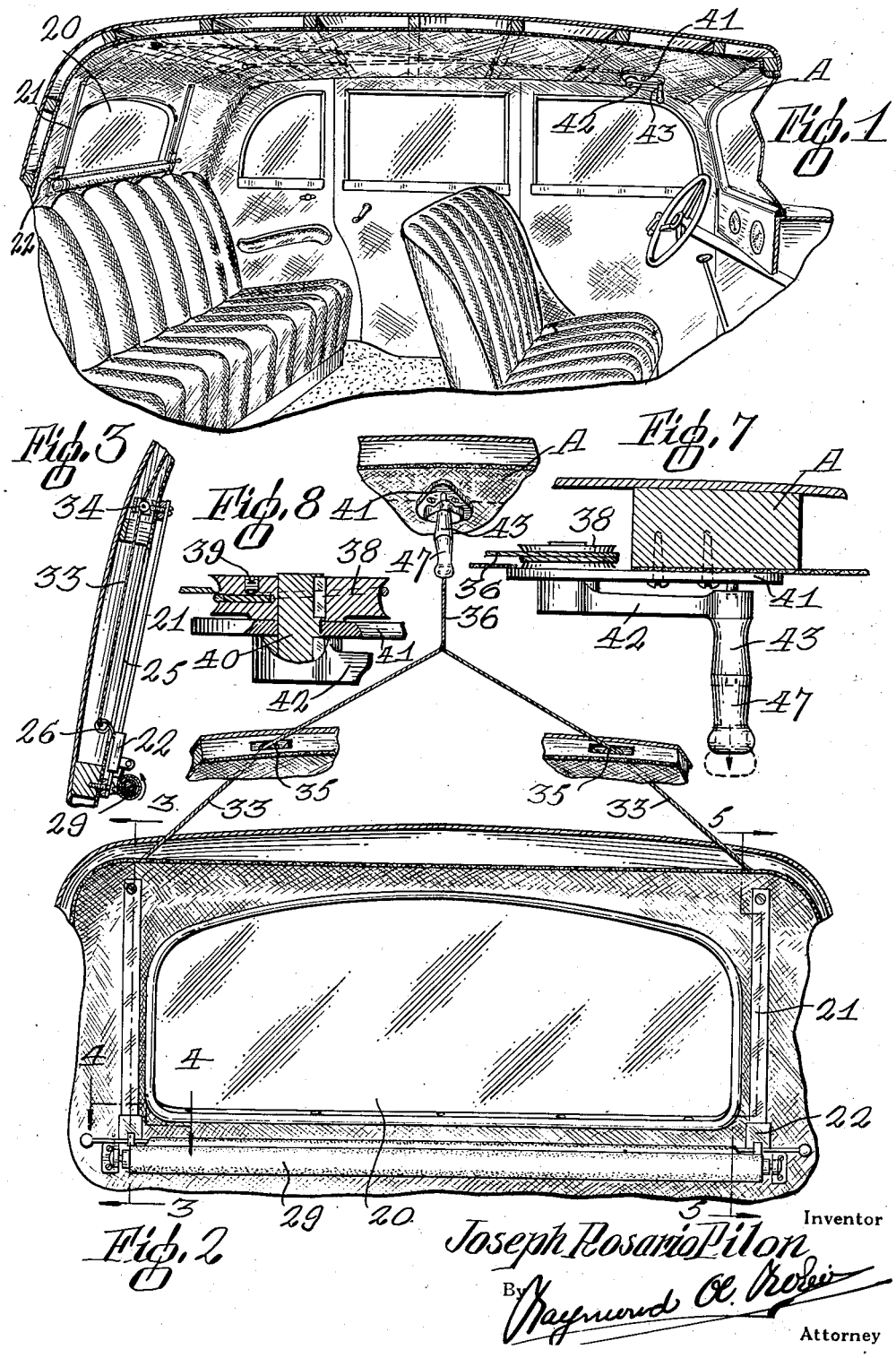
Inventor
Joseph Rosario Pilon
By Raymond O. Rosa
Attorney July 6, 1937. J. R. PILON 2,086,092
SHADE APPARATUS FOR VEHICLES
Filed March 23, 1936 2 Sheets-Sheet 2
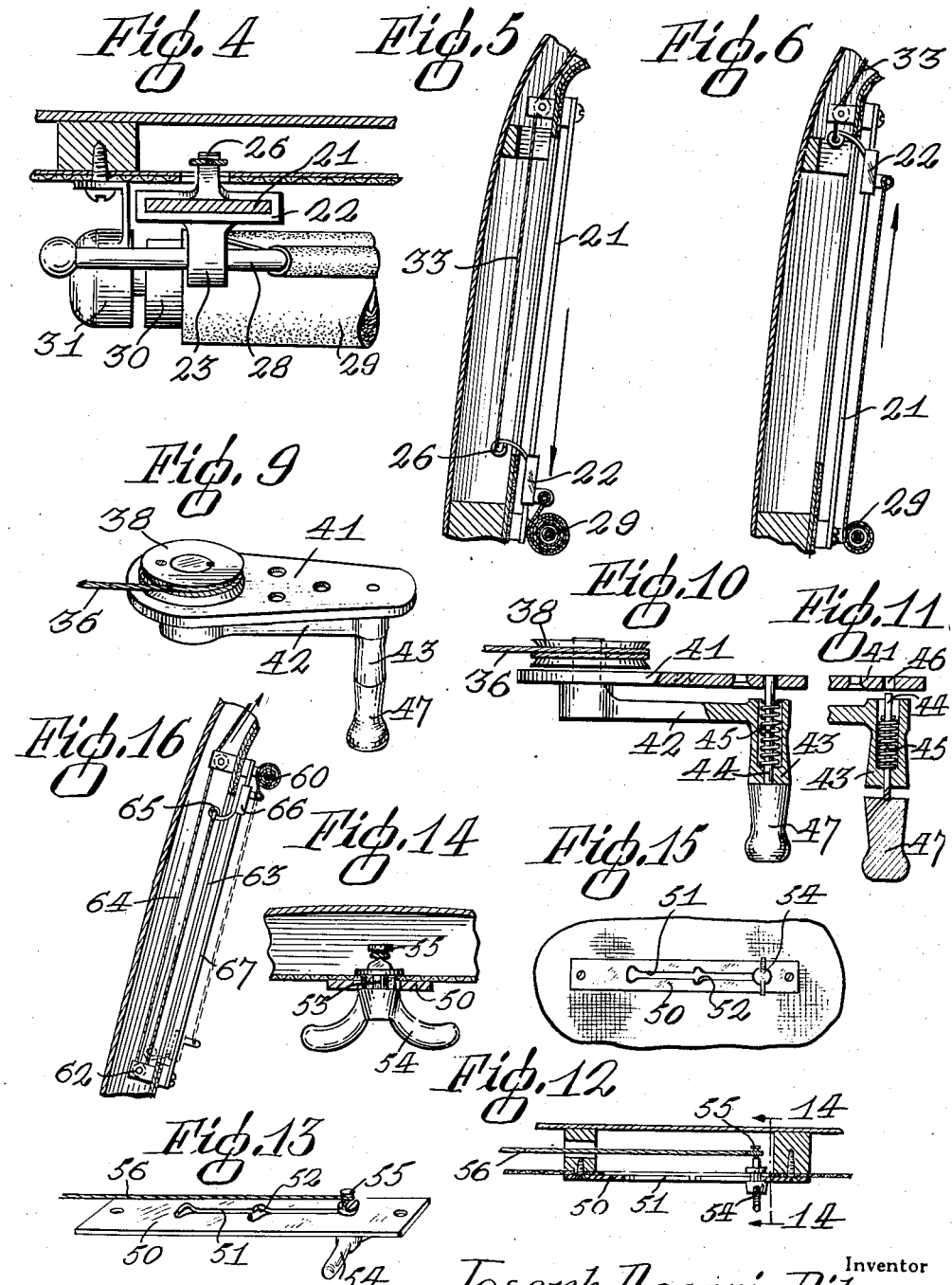
Inventor
Joseph Rosario Pilon
By Raymond A. Robie
Attorney Patented July 6, 1937

2,086,092

UNITED STATES PATENT OFFICE 2,086,092

SHADE APPARATUS FOR VEHICLES

Joseph Rosario Pilon, Montreal, Quebec, Canada

Application March 23, 1936, Serial No. 70,375

1 Claim. (Cl. 156—28)

The present invention relates to improvements in shade apparatus for vehicles and the like.

An object of the invention is the provision of shade apparatus for vehicles constructed so as to enable operation of a rear vehicle shade from a position remote from the shade and conveniently accessible to the driver in ordinary driving position.

Another object of the invention is the provision of shade apparatus of the aforesaid character which will be reliable in operation.

A further object of the invention is the provision of shade apparatus of the above character which may be readily installed in conventional types of automobiles.

Still another object of the invention is the provision of shade apparatus of the aforesaid character which is simple and durable in construction.

Other objects and advantages of the invention will become apparent as the description progresses.

In the accompanying drawings forming a part of this specification and in which like reference characters are employed to designate corresponding parts throughout the same:

Figure 1 is a fragmentary perspective view of an automobile showing the preferred form of the apparatus installed therein, Figure 2 is an enlarged interior fragmentary perspective view of the same, Figure 3 is a transverse section on line 3—3 of Figure 2, Figure 4 is an enlarged fragmentary section on line 4—4 of Figure 2, Figure 5 is an enlarged section taken on the line 5—5 of Figure 2, Figure 6 is a similar view showing the shade in extended arrangement, Figure 7 is an enlarged fragmentary section through the vehicle top showing the shade actuating mechanism in elevation, Figure 8 is a section through the winding drum, Figure 9 is a perspective view of the winding mechanism, Figure 10 is a side elevational view of the same with the crank in locked position, Figure 11 is a similar view showing the crank fastening trigger in released position, Figure 12 is a fragmentary longitudinal section through a modified form of shade actuating means, Figure 13 is a perspective view thereof, Figure 14 is an enlarged transverse section taken on line 14—14 of Figure 12, Figure 15 is a bottom plan view of the section shown at Figure 12, and Figure 16 is a transverse section through another modified form of the apparatus.

Referring particularly to Figures 1 to 11 inclusive, wherein is illustrated a preferred embodiment of the apparatus, A generally designates a conventional type of automobile having a window 20 at the rear of the body or rear downward extension of the top.

At each side of the window 20 is fastened a vertically extending guide bar 21 spaced from the interior or lining structure of the body, as shown to advantage at Figures 3, 5 and 6. On each guide bar 21 is slidably fitted a slotted slide member 22 adapted to slide longitudinally on the guide bar and having formed at one side a laterally projecting eye 23. At the opposed inner side each slide 22 carries an arm extending through an elongated slot 25 in the body lining adjacent the bar 21, said arm being formed with an attaching loop 26 at the end thereof.

A transversely extending rod 28 having the end portions projecting through and supported in the complementary eyes 23 is disposed parallel with a flexible shade 29 connected to and adapted to be rolled on a conventional form of spring roller 30. The end spindles of the roller 30 are fitted in sockets 31 formed on brackets attached to the body lining, adjacent the bottom of the guide bars 21. One end edge of the shade 29 is folded over and fastened about the intermediate portion of the rod 28, as shown at Figures 2 and 4. The spring roller 30, on which the shade 29 is mounted, is constructed and arranged so as to yieldingly urge the shade to a rolled up position and to normally dispose the shade rod 28 and the slides 22 to downward positions.

To the looped end of each slide arm 26 is attached one end of a pair of complementary cords or cables 33 trained over guide pulleys 34 and 35 and extending between the lining and the exterior shell of the top. The two cords having connection with the respective slides join a single cord 36 adjacent the front end of the vehicle top.

One end of the single cord 36 is connected to a grooved winding drum 38, as for instance by a fixed screw 39. The drum 38 is fixed on the upper end of a shaft 40 journalled in a bearing opening in a plate 41 attached to the top or to the bottom face of the lining. To the lower end of the shaft 40 is connected the eye of a crank arm 42 formed at the outer end with a handle 43. The handle 43 is provided with a through bore in which is slidably fitted a trigger rod 44 and is also provided with a counterbore in which is mounted a compression spring 45 which acts against a pin on the trigger to normally project the outer end of the rod to a locking position against the plate 41 and into engagement with a locking aperture 46. At the opposite lower end of the trigger rod 44 is provided an actuating knob 47 movable to retract the trigger for rotation of the crank.

Thus, the vehicle driver may conveniently operate the shade from an open rolled up position, as shown at Figure 2, to a closing or window covering position by pulling downwardly on the knob 47 to release the trigger 44 and rotating the crank so as to wind the cord 36 on the winding drum 38 and actuate the slides so as to adjust the curtain to the desired window covering position. When the crank is rotated in the reverse direction, the spring in the shade roller 30 will roll the shade to a rolled-up position.

A modified embodiment of the apparatus, shown at Figures 12 to 15 inclusive, embodies an actuating structure embodying an elongated plate 50 formed with a longitudinal slot 51 provided at the ends and at an intermediate point with V-shaped oppositely disposed notches 52. A pin 53 is slidable in the slot 51 and is formed with radial webs engageable with the notches 52 for releasably securing the pin in adjusted position. To the lower end of the pin 53 is connected a winged head 54, while the top portion of the pin is formed with an extension stem 55 to which is connected the forward end of a shade actuating cord 56.

To adjust the shade to a window covering position, the head 54 and the pin 53 attached thereto are slid longitudinally forward in the slot 51 and, at a predetermined position, are turned so that the pin-webs engage the notches 52 to lock the pin in the slide.

Still another modification of the apparatus, shown at Figure 16, embodies a structure wherein a shade carrying roller, indicated at 60, is mounted at the top of the rear vehicle window. This construction differs from the preferred form of the apparatus principally in the provision of sheaves 62 mounted in brackets disposed adjacent the bottom of the slide arm slots 63 so that the ropes 64 attached to the slide loop 65 are trained over the bottom sheaves 62 and when the cords are pulled forwardly by the actuating device, the slides 66 are moved downwardly on the guide bars 67 moving the free end of the roller shade downwardly to window covering position. When the ropes 64 are released, the spring action of the spring roller rolls the shade to the top to an open non-covering position.

It is to be understood that the forms of my invention herein shown and described are to be taken as preferred examples of the same, and that various changes as to the shape, size and arrangement of parts may be resorted to without departing from the spirit of the invention or the scope of the subjoined claim.

Having thus described my invention, I claim:—

In a shade apparatus for windows set in double-walled enclosures, a spring roller shade secured to the inner wall of the closure, flat bars secured to said wall right angularly to the roller axis and at the ends of the said roller, sliders movable on said bars and to which the free end of the shade is attached, an extension secured to each of said sliders extending into the space between the two walls through a slit provided in said inner wall and hidden from view by the bars so as to provide means for actuating the sliders, and means for remotely actuating the shade through the instrumentality of the extensions to which said means are attached.

JOSEPH ROSARIO PILON.